Jan. 21, 1969 — W. A. RAY — 3,422,851
FLOW VALVE WITH MECHANICALLY INTEGRATED VENT VALVE
Filed Feb. 15, 1967 — Sheet 1 of 2

INVENTOR.
WILLIAM A. RAY
By Pauen Hemminger
ATTORNEY.

INVENTOR.
WILLIAM A. RAY
BY
ATTORNEY.

United States Patent Office 3,422,851
Patented Jan. 21, 1969

3,422,851
FLOW VALVE WITH MECHANICALLY
INTEGRATED VENT VALVE
William A. Ray, North Hollywood, Calif., assignor to
International Telephone and Telegraph Corporation,
New York, N.Y., a corporation of Delaware
Filed Feb. 15, 1967, Ser. No. 616,341
U.S. Cl. 137—630.19        13 Claims
Int. Cl. F16k 45/00

ABSTRACT OF THE DISCLOSURE

A chamber is provided in communication with the external reaches of the main valve sealing means. A vent valve is opened upon closing of the main valve to vent any fluid that may leak past the sealing means while the main valve is closed. Additional structural features of the vent prevent its opening while the main valve is open, or prevent its closing while the main valve is closed.

This invention relates to a unique safety vent valve for a flow valve which is particularly useful for controlling fuel being conducted to burners in large boiler operations.

On large boiler burners using gas or oil, or on any other large fluid fuel fired furnace, it is desirable that safety means be provided to prevent hazardous situations from arising in the event the main fuel valve should leak when closed or when closing. This is particularly so in view of present trends toward power operated fans providing air for the burning operation in that if the fan fails or the furnace is shut down, a substantial volume of fuel can accumulate in the essentially sealed boiler chamber. Accordingly, it is highly undesirable to allow any fuel to accumulate because of the possibility of a major explosion occurring.

As one means of solving this safety problem, a pair of electrically controlled valves are placed in series in the fuel line and a vent valve, set to automatically open on the closing of the main valves, is connected between the two main fuel valves. While such a system is quite workable, it is still not absolutely safe in that it depends upon the perfect operation of the valves and their electrical interconnections. Although, it is very unlikely that an unsafe condition should arise with such a system, there is, nevertheless, the possibility of one or more of the three valves failing with a resulting hazardous situation.

In another approach for solving this problem, a main valve is provided in which the main passageway has two sealing shutoffs and a vent valve is mechanically connected to the main valve to function upon the closing of the main valves. Such an arrangement is illustrated in U.S. Patent 3,101,740 and although it is highly reliable in the sense that the vent valve will always open upon the closing of the main valve, the capacity of the vent valve is relatively small with respect to the capacity of the main valve unless the vent valve construction is made prohibitively large. This is due to the fact that the vent is connected to be continuously moved with the main valve. While the likelihood of a need for great capacity through a vent valve is slight, it is desirable that the vent valve have a large percentage of the capacity of the main valve. Such apparent extremes in the desirable characteristics of the safety vent valve are advisable in view of the serious consequences which could arise from the explosion of a large power generating boiler. In addition to the economic losses of several millions of dollars caused by the destruction of the boiler and associated electrical generating equipment, there is the potential additional loss of life and property resulting from the immediate explosion. There is also the great inevitable losses resulting from power failure in the area being served by the boiler.

Accordingly, it is a primary object of this invention to provide an improved vent valve mechanically integrated with a valve particularly suited for controlling the flow of gaseous fuel.

It is a further object of this invention to provide such an improved valve construction wherein the vent valve is unaffected by the movement of the main valve from its open to its completely closed position and the vent valve is then moved to a completely open position of substantial capacity by small additional movement of the main valve.

It is yet another object of this invention to provide such a valve construction having safety features for positively preventing the opening of the main valve while the vent valve is open and for positively opening the vent valve after the closing of the main valve.

In accordance with the preferred form of the invention, the main fuel valve is in the form of a rotatable sphere or ball valve in which the ball has a passage extending therethrough for connecting the valve inlet and outlet. A vent valve opening is formed in the valve body between the inlet and outlet and is normally isolated from the inlet by a sealed cavity. A large capacity vent valve is provided which controls the flow of fluid from the cavity. This vent valve includes a fixed valve seat and a movable valve element. It is operated by the same shaft connected to the ball of the main valve; however, the connecting means is such that the rotation of the shaft while closing the main ball does not affect the movable vent valve element until the passage through the ball is no longer registrable with the main inlet and outlet. The movement of the ball valve to close the main valve requires the substantial majority of a 90° rotation of the shaft and the vent valve is then operated by the shaft during the remaining angular motion of the shaft in completing a 90° arc.

In a preferred form of this invention, the vent valve is of the rotary slide type having a fixed orifice plate and rotary disc slidable thereon with each having a plurality of ports which may be aligned or misaligned to control flow through the vent valve. The connection between the shaft and the vent valve includes unique detent means for locking the vent valve in its closed position while the main valve is open and for positively closing the vent valve prior to opening of the main valve. With such an arrangement, the capacity of the vent valve may be made as large as desired while still maintaining an economical overall structure, and the vent valve may be completely opened or closed by means of limited rotational movement of the valve shaft.

Further features, objects and attendant advantages will become apparent with reference to the following drawings in which.

Figure 1:
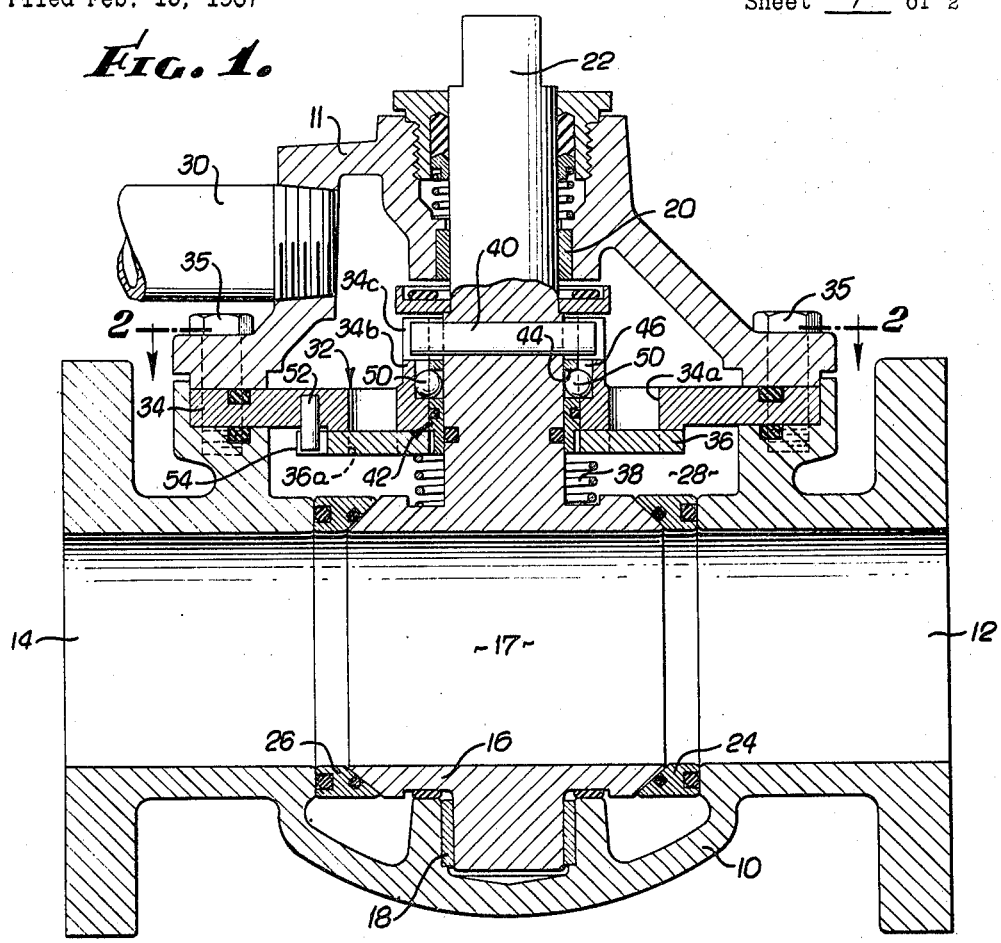
FIG. 1 is a cross-sectional showing of the combined valve construction of the invention.
Figure 2:
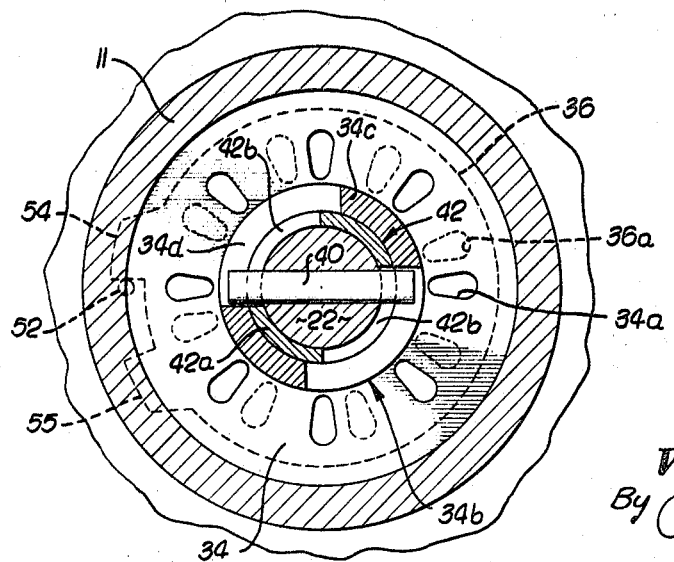
FIG. 2 is a view along line 2—2 of FIG. 1.

Referring now to FIGS. 1 and 2, the combined valve construction of the invention may be seen to include a valve body 10 having an inlet 12 and a outlet 14 interconnected by a bore through the valve body. While not necessarily so limited, the main valve element 16 of the valve is illustrated as a ball or sphere rotatably mounted by a lower bearing 18 surrounding a projection attached to the valve element and by an upper bearing 20 surrounding a shaft 22 attached to the element.

Suitable sealing assemblies 24 and 26 prevent leakage around the valve element into an annular cavity 28 surrounding the valve element 16. The cavity 28 is normally isolated from a vent opening 30 except for communication by means of a vent valve 32 surrounding shaft 22. The vent outlet 30 is actually formed in an additional body member 11 secured to the main body 10.

In accordance with the preferred form of this invention, the vent valve 32 is of the rotary slide type including a fixed orifice plate 34 clamped between body members 10 and 11 by suitable fasteners 35, and a rotatable vent valve disc 36 mounted for rotary slidable engagement with the plate 34. Plate 34 is provided with a plurality of spaced apertures 34a as can be seen in FIGS. 1 and 2, and disc 36 is provided with a similar series of ports 36a. The ports through plate 34 may, of course, be opened or closed by rotating disc 36 to align or misalign the ports. A spring 38 surrounding the lower portion of shaft 22 and extending between the upper surface of a valve element 16 urges disc 36 into engagement with plate 34.

Plate 34 is formed with an axially extending cylindrical portion 34b which terminates with two axially extending fingers 34c defining arcuate slots 34d as seen in FIGS. 2, 3a, 4a, and 5a. Within the slots 34d rides a pin 40 transversely extending through shaft 22 so that the fingers 34c marking the end of slots 34d limit the rotational movement of pin 40 and hence shaft 22 and valve element 16 to 90° as illustrated.

A drive sleeve 42 surrounding shaft 22 has its lower end secured to disc 36 while the remainder of the sleeve extends upwardly between plate 34 and its axial extension 34b. Similar to the upper end of extension 34b, the upper end of drive sleeve 42 is formed with two axially extending projections or fingers 42a which define two spaced curved slots or tracks 42b define an arc of approximately 75° in contrast with the 90° of slots 34d. The interengagement of pin 40 with the fingers 42a defining the slots 42b is utilized to rotate drive sleeve 42 and hence disc 36 into the valve open position as will be subsequently described in greater detail.

Figure 3:
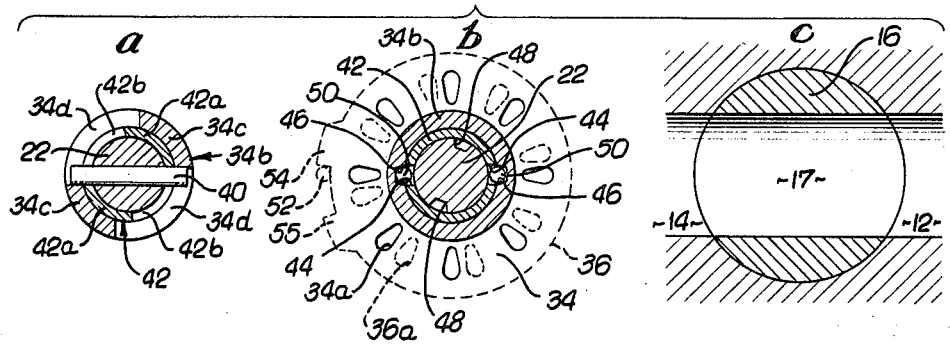
FIG. 3 illustrates in somewhat schematic form the position of the valve structure with the main valve open and the vent valve closed.
Figure 4:
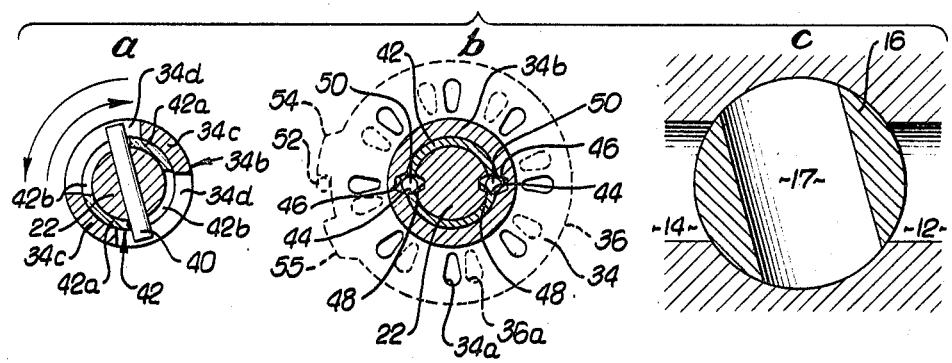
FIG. 4 shows both valves closed.
Figure 5:
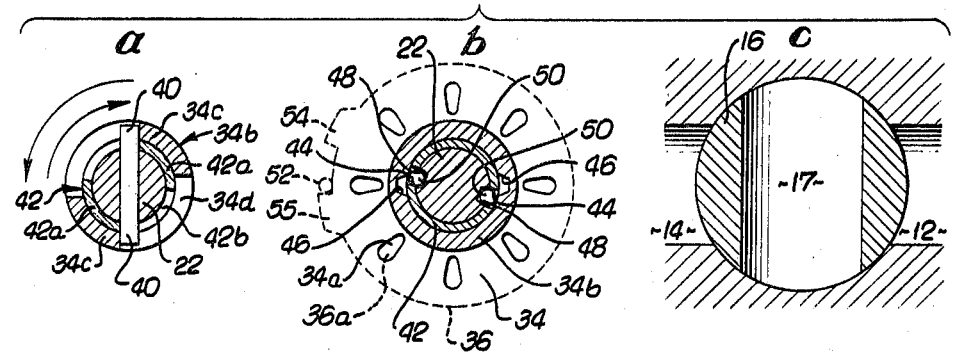
FIG. 5 shows the main valve closed and the vent valve open.

As a further aspect of this invention, there is provided a unique detent means for selectively locking vent valve disc 36 in its closed position when the main valve is open, and further for closing the vent valve before opening the main valve. The detent means, as best seen in FIGS. 3b, 4b, and 5b, includes a pair of diametrically spaced ports or apertures 44 formed in the side wall of sleeve 42, a pair of slots or notches 46 diametrically spaced in the side wall of the upper end of extension 34b on plate 34, and a pair of recesses or sockets 48 diametrically spaced in the side of shaft 22. The apertures 44, the notches 46, and the sockets 48, are all formed in the same axial plane so that when angularly aligned they are in communication with each other. A pair of floating balls 50 are located in apertures 44 and carried by drive sleeve 42. Since the diameter of a ball 50 is greater than the radial thickness of sleeve 44, a portion of each ball extends either to the inside or outside of sleeve 42. If it extends outwardly as in FIGS. 1 and 3b, a portion of each ball is positioned within respective notches 46 in extension 34b. If extending inwardly, they are partially received within the sockets 48 formed in shaft 22 as shown in FIG. 5. In FIG. 4, the balls 50 are centrally positioned and extend partially into notches 46 and sockets 48.

To provide positive limits or stops for the movement of disc 36, there is employed a pin 52 secured to orifice plate 34 and extending downwardly therefrom between two lugs 54 and 55 formed on the outer periphery of valve disc 36. As may be seen, the pin 52 is confined within the slot or space formed between projections 54 and 55 which mark the limits of rotation of disc 36.

OPERATION

In FIG. 1 the unique valve combination of the invention is shown with the main valve open and the vent valve closed which is the normal operating condition when the valve is connected to a burner and a fuel line for example, and fuel is flowing through the valve to the burner. The condition of the main valve is also schematically shown in FIG. 3c where the ball valve is viewed from above; and it can be seen that passage 17 within ball 16 is aligned with the valve inlet and outlet 12 and 14.

In this position, the vent valve 32 is closed as can be seen in FIGS. 1, 2 and 3b, wherein the ports 36a in the movable disc 36 are circumferentially misaligned with the ports 34a formed in orifice plate 34. Consequently, any fuel escaping around the seals 24 for the main valve 16 cannot escape through the vent valve to the vent outlet 30. The vent valve cannot be inadvertently opened because balls 50 are confined within apertures 34 and notches 46 formed in projection 34b of fixed plate 34. Thus, valve disc 36 is securely locked and cannot be rotated by means of its drive sleeve 42. Moreover, as can be seen in FIGS. 2 and 3a, drive pin 40 is in this position shown at its extreme counterclockwise orientation and thus is not in location to move or drive sleeve 42 in a clockwise direction to open the valve.

To close the main valve 16 it is, of course, necessary to rotate shaft 22 in a clockwise direction in view of the location of fingers 34c, as viewed in FIG. 3a. In the preferred example of the invention, it is necessary to rotate shaft 22 and its pin 40 approximately 75° in a clockwise direction to completely close the main valve. As can be seen from FIG. 4c, the passage 17 in the ball valve element 16 is at that point misaligned with the main inlet and outlet so that fluid flow through the main valve is prevented. Movement of this type is permitted by slots 34d and 42b, and fingers 42a mark the end of the 75° movement. Note that the pin 40 has not yet rotated the vent valve disc. Accordingly, the vent valve remains in closed position as illustrated in FIG. 4b. The vent valve has been placed in condition to be opened, however, by the rotation of shaft 22 in that as seen in FIG. 4b, sockets 48 formed in shaft 22 are now radially aligned with the apertures 44 in drive sleeve 42. Thus, while the vent valve is still closed, it is in position to be moved in a clockwise direction in that the balls 50 can move out of locking engagement with notches 46 formed in projection 34.

It should be noted in passing, that as the main valve is being closed the passage 17 interconnects the cavity surrounding the ball 16 with inlet 12 so that full inlet pressure is felt by vent valve disc 36 at this point. Such is not illustrated from the schematic view in FIG. 4, however, it can be appreciated that this is the case by observing in FIG. 1. This fact emphasizes the need for the vent valve being closed until the main valve is closed.

By rotating shaft 22 and thus pin 40 another 15° to the point where pin 40 engages the fixed fingers 34c as shown in FIG. 5a, the main valve is rotated to the position illustrated in FIG. 5c wherein the passage 17 is essentially perpendicular to the main fluid flow through the valve. This additional rotation also causes pin 40 to engage fingers 42a on drive sleeve 42 and rotate drive sleeve 42 and the attached valve disc 36 in a clockwise direction, thus causing the vent valve ports 34a and 36a to be moved from the completely closed or misaligned position to the completely aligned or open position illustrated in FIG. 5b. Accordingly, while the main valve is thus closed, any fuel leaking past the main valve seals is ducted through the vent valve 32 to the vent valve outlet 30 thereby preventing any potentially dangerous accumulation of fuel within the boiler burner to which the valve is connected.

It should be noted that although fingers 34c limit the rotation of pin 40, as a further precaution, pin 52 secured to plate 36 engages projection 55 as shown in FIG. 5b to positively prevent the vent valve from moving beyond the open position to a point where the valve might once more begin to close.

Rotation of the vent valve to the open position has also caused the detent balls 50 to be forced from notches 46 in projection 34b so as to extend partially into sockets 48 formed in shaft 22 as illustrated in FIG. 5b.

Consequently, the sleeve 42 and vent valve disc 36 are locked by the detent balls 50 to the shaft 22. This prevents the vent valve from being inadvertently closed, and it can only be closed upon movement of the shaft which will also start to open the main valve.

When it is desired to open the main valve, the shaft 22 is rotated in a counter-clockwise direction causing the balls 50 to simultaneously drive sleeve 46 in a counter-clockwise direction, which action will close the vent valve, returning it to the position illustrated in FIG. 4b. Note that the ball detent arrangement provides the driving interconnection for this action and that the drive pin 40 merely moves freely within the slots 32d and 42b without providing any driving action.

After the vent valve has been closed, pin 52 secured to fixed orifice plate 34 prevents further counter-clockwise rotation of vent valve disc 36 by interengagement with projection 54, as can be seen in FIG. 4b. Thus, again, positive means prevent the vent valve disc from being rotated too far so that the vent valve is once more opened. In view of this positive stop means, the main valve can now be safely opened upon further counter-clockwise rotation of shaft 22.

Figure 6:
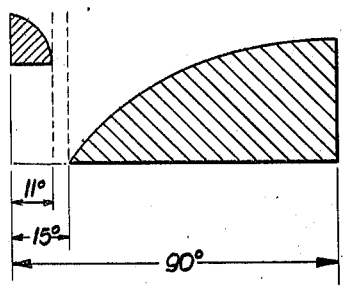
FIG. 6 shows a graph depicting the operation of the valve construction.

The foregoing described operation of the combined valve construction can be further understood by reference to the graph of FIG. 6, which in reading from left to right illustrates the sequence of the vent valve closing and the main valve opening. The graph abscissa is marked in degrees of angular rotation while the ordinate represents flow capacity. As shown, approximately 11° of rotation is required to completely close the vent valve. A safety feature of 4° is provided before the opening of the main valve is commenced, thus, after 15° of rotation, the main valve can be safely opened and this action is completed by 75° of rotation.

One of the primary features of the invention is that the unique valve arrangement described permits the vent valve capacity to be selected as desired. It is possible for example to have the vent valve capacity equal the main valve capacity by changing the size of ports 34a and 36a, although as illustrated the main flow is considerably greater.

From the foregoing it can be seen that a unique and extremely safe, positively acting main valve and vent valve combination has been provided which is particularly well suited for use in large fuel lines connected to large capacity burners or boilers. Although a single embodiment of this invention has been illustrated, it should be appreciated that various modifications and changes will now be apparent. Accordingly, it is intended that all such changes and modifications that fall within the true spirit of the invention be included in the claims.

What is claimed is:

1. The combination of a main flow control valve and a mechanically integrated vent valve comprising: a valve body having a main inlet, a main outlet, and a vent valve opening between said inlet and outlet; a main valve element rotatably mounted in said body and having a passage registrable with said inlet and outlet; a shaft connected to said element for rotating the element; means for limiting the rotational movement of said shaft and element to approximately 90°, with said element being rotated from a fully open position, wherein said passage is aligned with said inlet and outlet, through a substantial majority of said 90° to a position wherein said passage no longer interconnects said inlet and outlet; means defining a cavity in said body in communication with said vent valve opening and isolated from the main inlet and outlet when said passage is registrable with the inlet and outlet; a vent valve in said cavity controlling fluid flow from said cavity to said opening including a fixed valve seat and a movable valve element; and means connecting said shaft and said vent valve element for operating said vent valve during the rotation of said shaft after said main valve is closed, means for locking said vent valve element while said main valve is open and moving said shaft from a fully closed position to a fully open position by such main limited rotational movement of said shaft after said main valve is closed.

2. The combination of claim 1, wherein said main valve element is rotatable from the fully open position to the fully closed position by movement of said shaft through an angle of approximately 75°, during which angle said vent valve element remains in a fixed position; and said vent valve is positioned from fully closed and fully open positions by movement of said shaft through an angle of less than 15°.

3. The combination of claim 1, wherein said vent seat includes an orifice plate having a plurality of spaced ports and said movable vent valve element includes a disc having a plurality of spaced ports, said disc being positioned with said plate so that upon rotation of said disc the ports in said plate are opened or closed.

4. The combination of claim 3, wherein said connecting means includes drive means fixed to said shaft; a drive sleeve fixed up to said disc and extending through said orifice plate between said plate and said shaft, with said sleeve being positioned by said drive means to rotate said disc to open said vent valve; and detent means carried by said sleeve for connecting said sleeve to said orifice plate to lock said vent valve in closed position when said main valve is open, said detent means permitting said disc and sleeve to be unlocked from said orifice plate when said main valve is closed, and said detent means further connecting said sleeve to said shaft when said main valve is closed and said vent valve is open, said detent means permitting said drive means to rotate said sleeve and disc from vent open position to vent closed position before said main valve is opened.

5. The combination of claim 4 including stop means for limiting movement of said sleeve and disc in the closing direction of said vent valve to thus prevent excess travel of said disc relative to said plate.

6. The combination of claim 4 wherein said detent means comprises: an aperture formed in said sleeve, a notch in an axial extension of said plate, and a socket in said shaft, said aperture, said notch, and said socket being in the same axial plane, a detent ball carried by said sleeve aperture having a diameter greater than the thickness of said sleeve whereby the ball extends partially into said plate notch or said shaft socket depending on the angular position of said sleeve and shaft.

7. The combination of claim 6 including an additional aperture in said sleeve, notch in said plate and socket in said shaft with each of said additional elements being diametrically spaced respectively from the first mentioned aperture, notch and socket and including a second ball cooperating with the additional elements.

8. The combination of claim 6 wherein said sleeve aperture and plate notch remain radially aligned with said ball being captured therein when said main valve is open; said shaft socket becoming aligned with said sleeve aperture and said plate notch as said main valve is closed, and said ball being captured within said sleeve aperture and said shaft socket as said shaft and sleeve are rotated through said drive means the limited amount necessary to open said vent valve; and said vent valve being closable by rotation of said sleeve as driven by said shaft through said detent ball.

9. The combination of claim 4 wherein said drive means includes a pin extending transversely through said shaft; and wherein said sleeve is formed with an arcuately extending slot in which said pin extends and said sleeve is movable by said pin as the pin engages the sleeve surfaces forming the ends of said slot.

10. The combination of claim 9 wherein said sleeve slot defines an angle of approximately 75° whereby said shaft and pin may be rotated through an angle of 75° before engaging the ends of said slot.

11. The combination of claim 10 including a slot formed in said plate extension surrounding said sleeve for receiving the end of said pin, said plate slot extending through an angle of approximately 90° with the portions of said plate defining the ends of said plate slot marking boundaries for limiting the rotational movement of said pin.

12. The combination of claim 4, wherein said valve element is spherical in shape and said body has mating spherical surfaces receiving said element; and said passage in said element forms a substantial portion of the element so that the passage is open to said cavity as said valve element is being closed with the result that said inlet is in direct communication with said vent valve during the closing operation.

13. The combination of claim 12 wherein said disc is between said orifice plate and said valve element; and including a spring extending between said element and said disc urging the disc against said plate.

References Cited

UNITED STATES PATENTS

| | | | |
|---|---|---|---|
| 965,555 | 7/1910 | Becker et al. | 137—630.21 |
| 1,977,592 | 10/1934 | Reure et al. | 137—596.2 |
| 2,988,109 | 6/1961 | Komrosky | 137—630.22 XR |
| 3,030,982 | 4/1962 | Navara | 137—630.19 |
| 3,101,740 | 8/1963 | Ray | 137—596 |

HENRY T. KLINKSIEK, *Primary Examiner.*

U.S. Cl. X.R.

137—596